May 30, 1939. N. W. LYON 2,160,387
BREAD SLICING MACHINE
Filed Oct. 12, 1936 6 Sheets-Sheet 1

INVENTOR
*Norman W. Lyon*
BY
*Chapin + Neal*
ATTORNEYS

May 30, 1939.  N. W. LYON  2,160,387
BREAD SLICING MACHINE
Filed Oct. 12, 1936  6 Sheets-Sheet 2

INVENTOR
NORMAN W. LYON
BY Chapin & Neal
ATTORNEYS

May 30, 1939.  N. W. LYON  2,160,387

BREAD SLICING MACHINE

Filed Oct. 12, 1936  6 Sheets-Sheet 3

INVENTOR
NORMAN W. LYON
BY
Chapin & Neal
ATTORNEYS

INVENTOR
NORMAN W. LYON
BY Chapin + Neal
ATTORNEYS

Patented May 30, 1939

2,160,387

UNITED STATES PATENT OFFICE 2,160,387

BREAD SLICING MACHINE

Norman W. Lyon, Springfield, Mass., assignor to National Bread Wrapping Machine Co., Springfield, Mass., a corporation of Massachusetts Application October 12, 1936, Serial No. 105,158

8 Claims. (Cl. 146—153)

This invention relates to slicing machines particularly adapted for slicing such articles as loaves of bread. In prior machines, particularly of the reciprocating knife type, there has been much difficulty in securing the proper timing of the sliced loaves with respect to the delivery conveyor which conveyed the loaves to the wrapping machine with which the slicer is generally associated. Particular trouble has been experienced due to the tendency of prior slicing machines to deliver two loaves at intervals between one pair of flights of the delivery conveyor. The wrapping machine is generally provided with stop mechanism by means of which waste of wrapping paper is avoided if no article is fed to it, but if two articles are fed to it at the same time the machine becomes jammed and there is likelihood of injury. In accordance with the present invention mechanism is provided by which the slicing machine is positively prevented from delivering two loaves between a single pair of flights of the delivery conveyor.

A further object of the invention relates to the manner in which the feeding mechanism which carries the loaves through the machine is driven. In prior machines the feeding of the loaves has been done positively, so that in case of incorrect timing or positioning of the loaves there was strong probability of damage. In accordance with the present invention the feeding of the loaves is accomplished by mechanism having a friction drive so that it is impossible to push the loaves through the knives hard enough to cause damage. This form of drive is also of importance in connection with the operation of the improved loaf timing mechanism as will be explained later.

A further object of the invention is to improve the mounting of the knives in their frames so that the tension on individual knives may be made more uniform, and so that the knives may be readily removed from their frames.

A further object of the invention is to improve the mounting of the knife frames so that they may be removed bodily from the machine without losing the strength and compact appearance of a machine having a closed top or requiring the disassemblage of the machine to permit the knife frames being taken out.

Additional objects will appear as the description proceeds.

Referring to the drawings.

Figure 2:
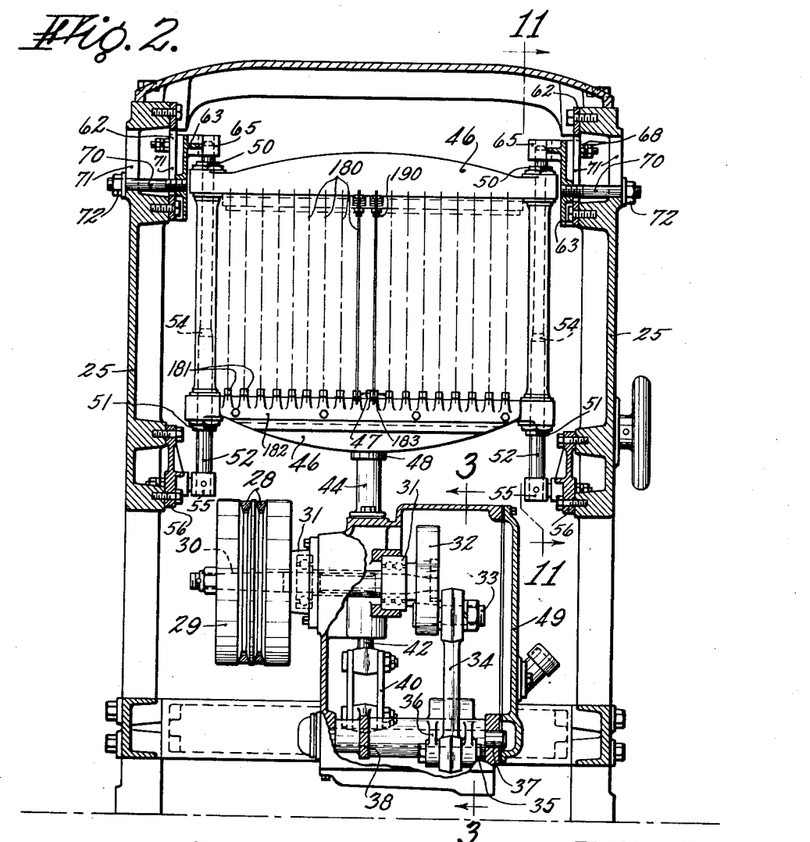
Fig. 2 is a section on line 2—2 of Fig. 1.
Figure 3:
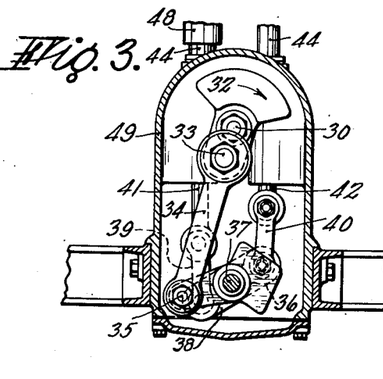
Fig. 3 is a section on line 3—3 of Fig. 2, showing the knife driving connections.

The machine is mounted on a frame 25, having a base and two side members of general A-form. Power for operating it is derived from two sources, a motor 26 which drives the knives only, and a shaft 27 which may be motor driven but which is usually driven from the wrapping machine with which the slicer is associated. Considering the knife drive first, the motor 26 is coupled by one or more belts or chains 28 with a pulley 29 on a shaft 30 provided with bearings 31. On one end of this shaft is a counterbalanced crank disk 32 (Figs. 2 and 3) the crank pin 33 of which is pivoted to a connecting rod 34. The other end of this connecting rod is pivoted at 35 to a counterbalanced rocker 36 mounted on a shaft 37. This shaft also bears a rocker 38 joined by links 39 and 40 to two reciprocating rods 41 and 42 which carry the knife frames in a manner to be described. The rods each pass through bearings 43 (Fig. 1) mounted in the frame, and then through upstanding bearing sleeves 44 mounted on the top of the frame base. The upper end of each rod has a reduced portion 45 receiving one of the two knife frames 46, which is secured in place by a nut 47 threaded onto the end of the rod. Each frame has a hollow portion 48 extending downwardly over the sleeve bearing 44 so as to keep any crumbs from the slicing operation from getting down into the bearings and to prevent any upward seepage of oil from reaching the knives. The crank mechanism is preferably confined within a housing 49 (Figs. 2 and 3) which may form part of the supporting frame.

The knife frames have their vertical sides formed with a hole extending throughout their height, as by having these sides formed out of tubular stock, the upper and lower ends of each hole being provided with bushings 50 and 51 (Fig. 2) respectively. The frames slide vertically on rods 52 having their upper portions 53 (Fig. 11) of a lesser diameter than their lower ends and connected thereto by a tapered portion 54. This double diameter is utilized in order to facilitate the assembly of the frames on the rods, the lower bearing 51 being applied first to the smaller end of the rods, upon which they are a very loose fit. By the time the upper bearings 50 reach the small end of the rods the frame will have been accurately centralized by the lower bearing riding up the tapered portion 54 of the rod.

Figure 12:
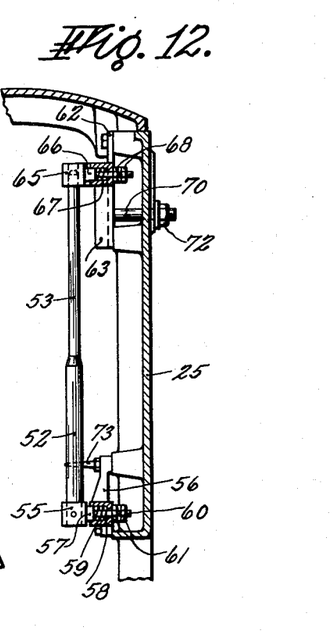
Fig. 12 is a section on line 12—12 of Fig. 11.
Figures 13, 14, 15:
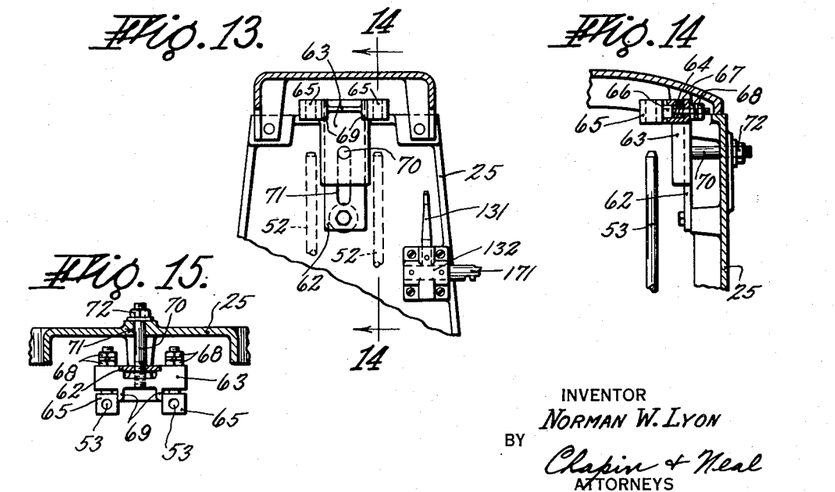
Fig. 13 is a detail similar to a portion of Fig. 11 but showing the upper frame guide support in a position permitting removal of the knife frames.
Fig. 14 is a section on line 14—14 of Fig. 13.
Fig. 15 is a section on line 15—15 of Fig. 11.

The lower end of each rod is received in and pinned to a block 55 (Fig. 12) pivotally secured in a bracket 56 mounted on one of the side members of the frame. For this purpose each block has a shank 57 fitting into a socket 58 in the bracket and pressed outwardly by a spring 59. An extension 60 of the shank passes through the bracket and is provided with nuts 61 so that the motion of the shank outwardly of the socket is limited in extent. This mounting of the rods permits the rods to be tilted so as to remove or replace the knife frames, and at the same time gives the rods a freedom of movement in the plane of the knife frames so that there will be no danger of binding if the frame expands due to the heat developed in slicing. The upper end of the rods do not require the pivotal movement, but do require a similar freedom of movement to prevent binding. Near the upper part of the side frames are guides 62 on which slide members 63 (see also Figs. 11, 13, 14 and 15) bearing sockets 64. Blocks 65, apertured to receive the reduced upper portions 53 of the knife frame guide rods, have shanks 66 received in these sockets and positioned by springs 67 and nuts 68 in the same manner as with the lower blocks. The upper blocks, however, are each prevented from turning by an extension 69 of the member 63 which passes between them as seen in Fig. 15. A stud 70 extends from the member 63 through slots 71 in the guide and the side frame, and is held in position by a nut 72.

Figure 11:
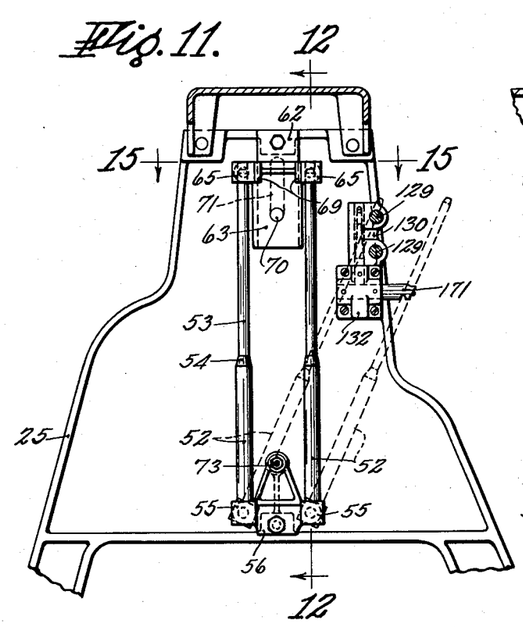
Fig. 11 is a detail showing the mounting for the reciprocating knife frames, taken on line 11—11 of Fig. 2.

The members 63 in their lower positions (Figs. 11 and 12) cause the blocks 65 to engage the upper ends of the rods 52 and hold them in position to permit the vertical reciprocation of the knife frames. If it is desired to remove the knife frames from the machine, as for sharpening the knives or for exchanging the frames for others of different spacing, the nuts 72 are loosened, the members 63 raised to bring the blocks above the tops of the rods, and the nuts again tightened to hold the members in this upper position. The nut 47 holding to the rod 42 that knife frame which is to the right as viewed in Fig. 11 is removed, and the right hand pair of rods 52 tilted as shown in dotted lines for both pairs in Fig. 11. The knife frame can then be drawn off the ends of the rods. The second knife frame is then similarly disconnected from its operating rod, and its guide rods tilted so that it can be withdrawn. Assembly of the knife frames is accomplished in the converse manner. In order to hold the rods in the correct tilted position one or more sets of pins 73 may be provided.

The loaves of bread are placed by the operator on a constantly moving belt conveyor 75 (Fig. 1) traveling over a supporting plate 76. This plate is carried by a framework 77 supported in part by legs 78 and in part by the frame 25 of the slicer. The belt is driven by a pulley 79 driven by a chain and sprocket connection 80 from a shaft 81. The shaft 81 also carries sprockets 82 which cooperate with sprockets 83 on a shaft 84 to support chains 85. These chains carry between them slats 86 having slightly upturned lips 87 which assist in engaging the bottoms of the loaves and feeding them towards the knives.

Figure 4:
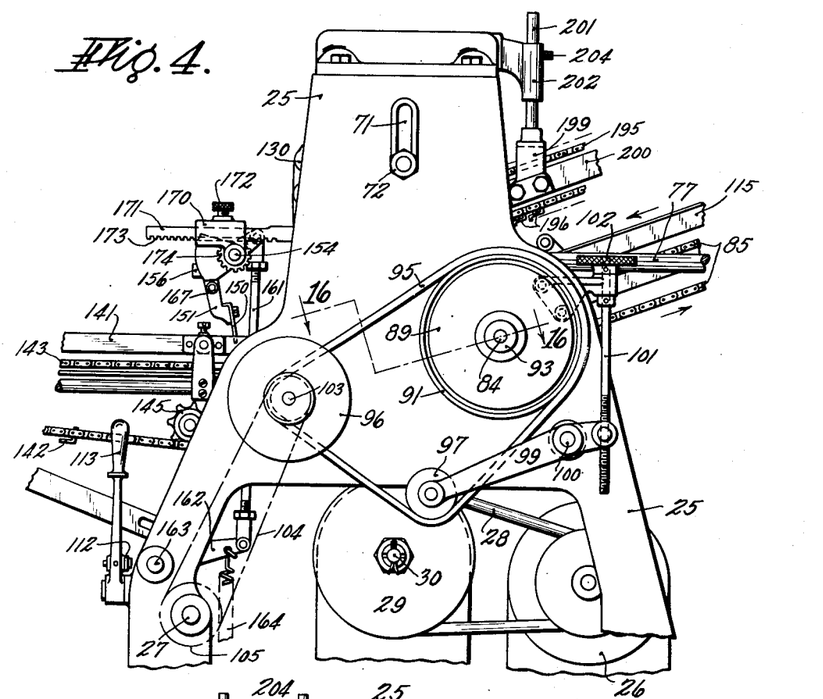
Fig. 4 is a view of the machine looking in the opposite direction from that in which Fig. 1 was taken, and showing the driving means for the loaf forwarding conveyors.
Figure 16:
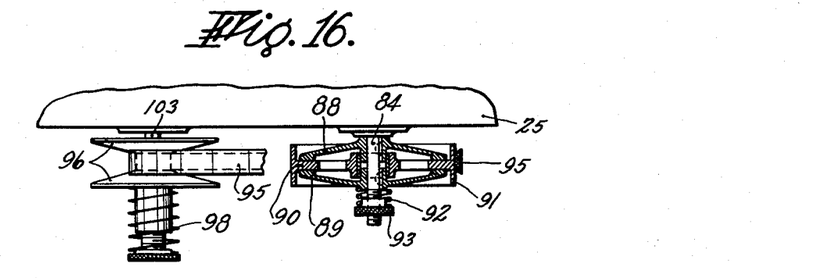
Fig. 16 is a detail of the friction drive for the loaf feeding conveyors, partially in section, taken on line 16—16 of Fig. 4.

Referring now to Fig. 16, it will be seen that the shaft 84, where it projects beyond the main frame, has keyed to it two friction disks 88, 89, which grip between them the central flange 90 of a pulley 91 which itself is loose on the shaft. The disk 89 is free to slide axially on the shaft and is pushed towards the other disk by a spring 92 under the control of a hand nut 93, carrying the loosely mounted pulley 91 with it. The resistance to turning of the shaft 84 at which the friction drive will slip can be regulated at will by changing the setting of the nut 93. A wedge-shaped driving belt 95 encircles the pulley 91, a double conical pulley 96 of the Reeves drive type, and a tightening pulley 97 (Fig. 4) which also serves to regulate the action of the Reeves pulley. The Reeves pulley, as is customary in this type of drive, is formed in two opposed conical parts pressed together by a spring 98 so that as the belt is drawn tighter the two halves of the pulley will be separated and the contact line of the belt made smaller in radius. The pulley 97, by which the tightening action of the belt is accomplished, is mounted on the end of a lever 99 pivoted to the frame at 100. A rod 101 is threaded into the other end of the lever and bears a handwheel 102 by which the position of the pulley can be changed. The shaft 103, on which the Reeves pulley is mounted, is joined by a chain and sprocket or belt connection 104 to the driving shaft 27 previously mentioned.

Figures 7, 8:
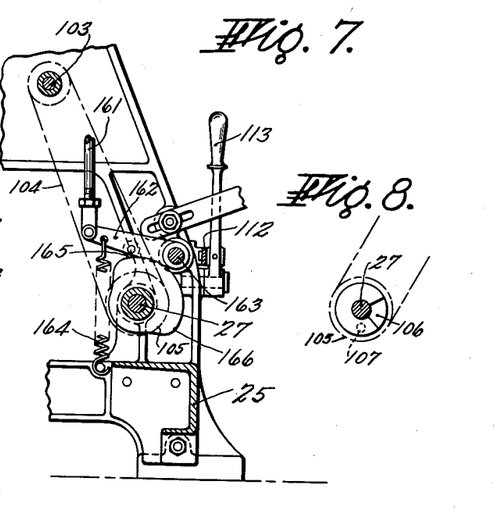
Fig. 7 is a section on line 7—7 of Fig. 6.
Fig. 8 is a detail of one of the clutch parts shown in Fig. 6.

In order to be able to disconnect the loaf feeding conveyors from the drive when desired the sprocket 105 which drives the chain 104 is mounted freely on the shaft 27 and is driven therefrom by a clutch mechanism. The hub of this sprocket is formed with a segmental groove or recess 106 (Fig. 8) into which a pin 107 is adapted to enter. The pin is carried in a member 108 (Fig.

Figure 6:
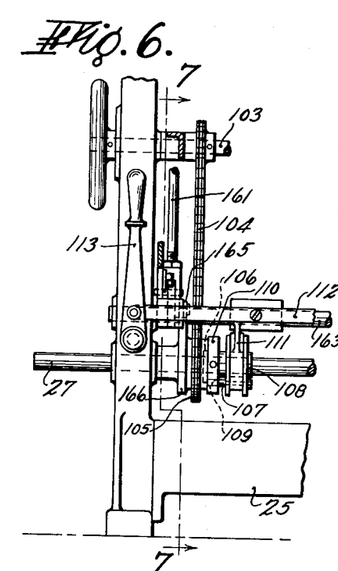
Fig. 6 is a detail of the clutch control for the loaf feeding means.

6) splined to the shaft 27, and passes through a hole 109 formed in a disk 110 pinned to the shaft. A shifting member 111 engages a groove in the member 108, and is carried by a bar 112 extending between operating handles 113 mounted on opposite sides of the machine. By shifting either one of these levers the pin can be moved from the position of Fig. 6, in which it is within the hole 109, to a position in which it extends beyond that hole into the groove 106. The disk 110 serves to support the pin at a point adjacent its engagement with the end of the groove 106, so as to strengthen it.

As the loaves of bread are carried towards the knives they are guided by side guides 115 (Fig. 1) suitably mounted on the frame in any standard way for adjustment towards and from each other to permit of the slicing of loaves of differing lengths. As the loaves leave the conveyor formed by the slats 86 they pass onto a bottom plate 116 having at its ends beyond the knives a block 117 held at the ends by spring pressed pins 118 (Fig. 22, Sheet 1) entering into holes in side brackets 119. At its other end the plate is beveled at 120 (Fig. 1) so as to fit into a beveled slot in a cross member 121. The plate is slotted at 122 so that it can pass between the reciprocating knives. By pulling out the pins 118 and drawing the plate to the right as viewed in Fig. 1 it can be removed from the machine to make room for the removal of the knife frames.

Figures 9, 10:
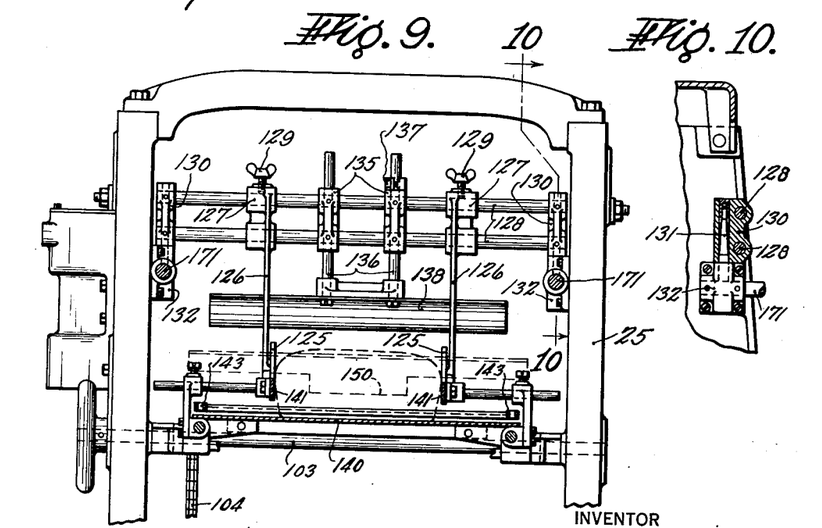
Fig. 9 is a section on line 9—9 of Fig. 1, showing the mounting for certain loaf guiding instrumentalities.
Fig. 10 is a section on line 10—10 of Fig. 9.

Above the plates 116 are side guides 125 carried, as seen in Fig. 9, on arms 126 supported from slides 127. These slides are mounted on a pair of rods 128 extending from one side of the machine to the other, and are held in adjusted position by set screws 129. The rods are received at their ends in blocks 130 having vertical holes through them by which they are supported on pins 131 extending upwardly from brackets 132 mounted on the side frames. The pins are preferably made conical to facilitate the application and removal of the blocks. The rods 128 also carry blocks 135 secured thereon in central position and having vertical rods 136 sliding therein, at least one of which is secured in adjusted position by a set screw 137. The rods bear at their lower ends a plate 138 folded so as to act as a top guide for the sliced loaves issuing from between the knives. The side guides 125 and the top guide 138 can be removed from the machine as a unit by taking the blocks 130 off from the pins 131.

Figure 17:
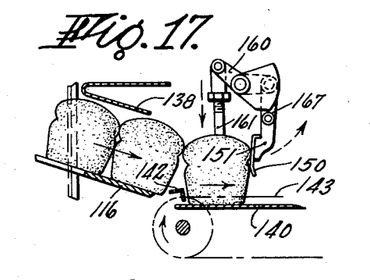
Figs. 17 to 20 are detail views showing successive stages in the operation of the mechanism for regulating the passage of the loaves through the knives and to the delivery conveyor.

As the sliced loaves pass off the plate 116 they are received upon a horizontal delivery plate 140 (Fig. 1) and between suitably adjustable side guides 141. Due to the angle between the plate 116 and the plate 140 there is a similar angular displacement between adjacent loaves at this point, as shown in Fig. 17, forming a space between the bottoms of the loaves sufficient to receive one of a series of pushers 142 carried by chains 143. One end of these chains passes around sprockets 144 on the shaft 103, the other end passes around an idler sprocket (not shown) and the chain is kept taut by a tightening sprocket 145. The loaves are delivered to the associated wrapping machine by the pushers 142, which move at a speed much greater than that of the conveyor 86 which pushes the loaves through the knives.

If it were possible to keep the loaves in motion down the chain conveyor and through the knives in exact timed relation to the motion of the delivery pushers 142 no further loaf handling devices would be necessary. In practice, however, there is an unavoidable variation in the speed with which the loaves progress through the slicing knives; due both to the operator not keeping a complete line of loaves in position on the feeding-in conveyor 75 and to variations in cutting speed due to differences in texture of successive loaves. The pushers 142 are comparatively widely spaced. If the loaves pass freely through the knives, therefore, there is danger that more than one loaf may be located between two successive pushers. To prevent this mechanism is provided for holding back the line of loaves passing to the slicing knives, and releasing the forward loaf of the series only when a pusher is in position to take it.

Figure 23:
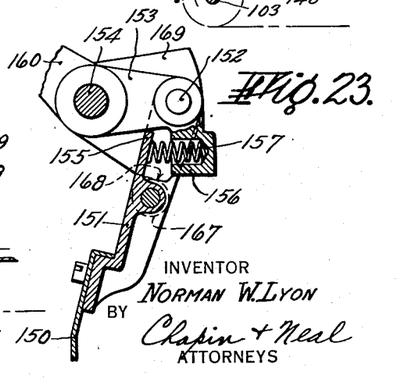
Fig. 23 (Sheet 6) is a detail of the construction of the loaf hold-back arm.

For this purpose a plate 150 extending across the path of the loaves is secured at each end to an arm 151 (Figs. 1, 4 and 23) pivoted at 152 to one arm of an offset bell crank free on a cross shaft 154. The arms 151 are not entirely free on the bell cranks 153, being limited in angular motion in one direction by contact of web portions 155 of the arms 151 with the lower sides of the bell crank arms 153, and in the other direction by contact of these web portions with lugs 156 extending downwardly from the bell crank arms 153. In addition, the arms 151 are constantly urged towards the position of Fig. 23 by springs 157 mounted in recesses in the lugs 156 and bearing against the webs 155. The second arms 160 of the bell cranks are joined by links 161 to arms 162 (Figs. 1 and 7) fixed on a lower cross shaft 163. These latter arms are drawn downwardly by springs 164 attached at one end to the arms and at the other end to pins on the frame. One of the arms 162 carries a cam roll 165 resting against a cam 166 carried by the sprocket 105. As the sprocket and cam rotate the latter will periodically permit the arms 162 to be lowered from the position of Fig. 1 by the action of the springs 164 if this action is not otherwise restrained.

Figure 18:
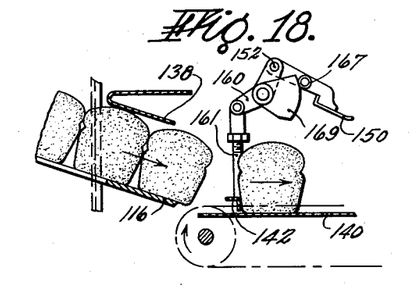
Figure 19:
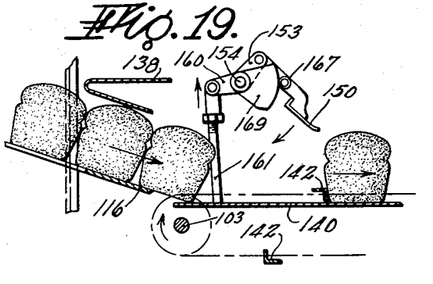
Figure 20:
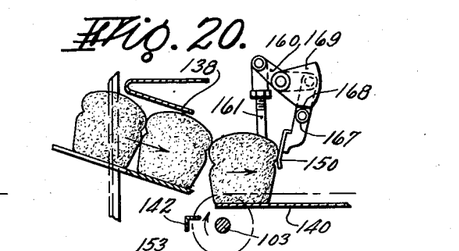

The described action will serve to raise the plate 150 from the position of Fig. 17 to that of Fig. 18 so as to release a loaf of sliced bread in timed relation to the passage of one of the flights 142. In order to avoid incorrect positioning of the sliced loaves it is desired to prevent this release unless a loaf is fully in position against the plate 150 prior to the time when the plate is raised. For this purpose the arms 151 carrying the plate are provided with rolls 167 (Fig. 23) which are normally kept by the springs 157 underneath a flat portion 168 of a stationary cam 169. By the pressure of a loaf against the plate, brought about by the presence of a complete line of loaves through the knives as shown in Fig. 17, these springs will be compressed and the rolls 167 moved over beyond the end of the flat cam portions 168. The plate 150 is thus rendered free to be raised by the action of the spring 164 when the cam 166 permits. The movement of the flights 142 is faster than the travel of the loaves through the knives, but the upward movement of the plate 150 is faster yet, as seen in Fig. 18, so that the leading loaf is freed and is then moved ahead of the others in the line so as to leave a considerable intervening space. This space is sufficient, as seen in Fig. 19, for the plate 150 to be returned to its lowered position before the next loaf can strike it.

Figures 1, 22:
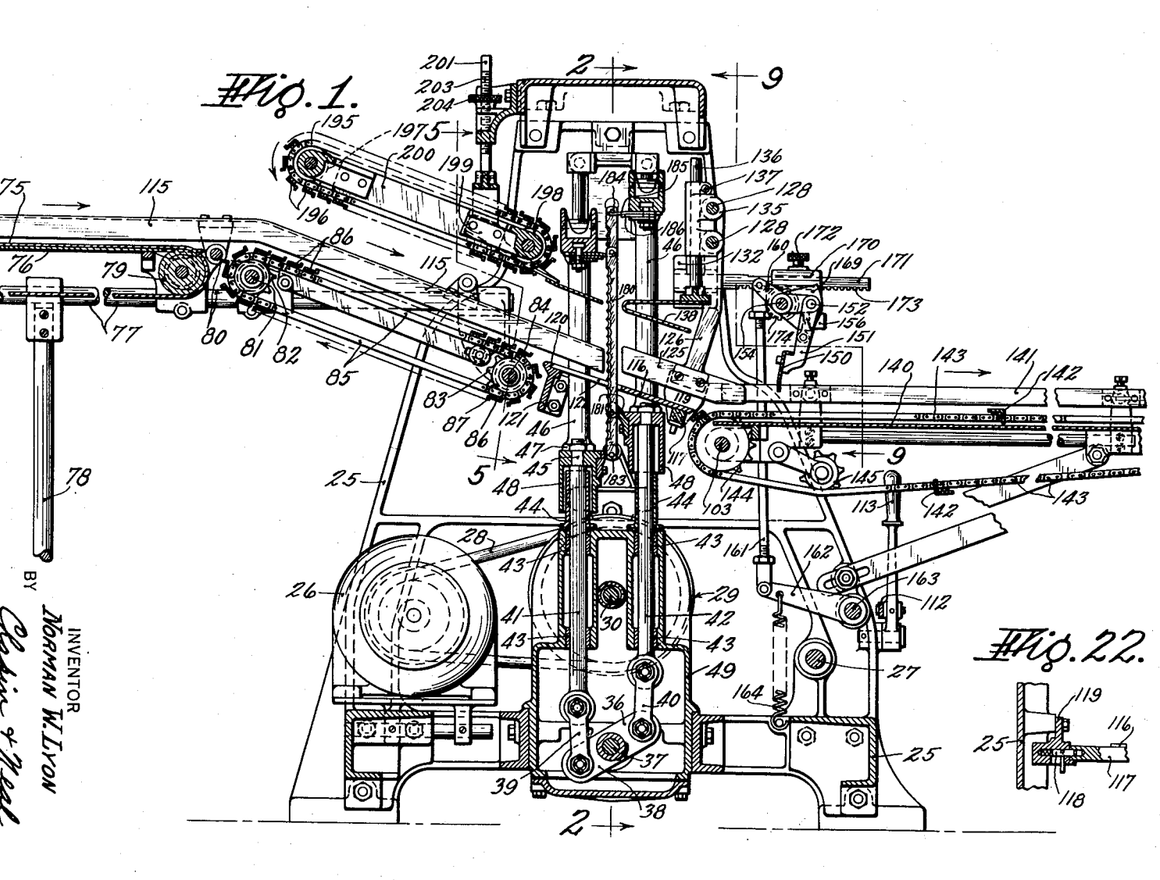
Fig. 1 is a central section through the machine.
Fig. 22 (Sheet 1) is a detail of the mounting for one of the loaf guiding plates.
Figure 21:
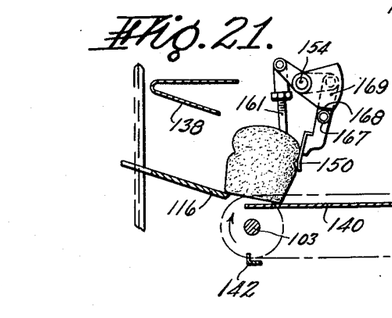
Fig. 21 is a similar view showing the action of the mechanism in the case where the delivery of the loaves through the knives is not correctly timed for the delivery conveyor.

If a loaf has not been firmly pressed against the plate 150 at the time when the cam permits the plate to be raised the action is different. In this case, shown in Fig. 21, the rolls 167 have not been pushed by the pressure of the loaf clear of the flat cam parts 168 before the plate carrying arms 153 of the bell cranks are drawn upwardly by the springs 164. Under these conditions the rolls 167 will be wedged against the flat cam parts 168, which as seen in Fig. 22 have a slight backward inclination, and the further pressure of the loaf will not be sufficient to cause motion of the arms 151 until such time as the tension of the springs 164 is again released by the action of the cam 166. As will be seen from Fig. 21, the loaf will be held by the plate in a position where it is incompletely seated on the plate 140, and under these conditions the flight 142 will pass underneath the loaf, raising it somewhat, but not carrying it along the delivery channel. Only when the pressure against the leading loaf is resumed by the completion of the series of loaves behind it will the plate 150 again be raised and the release of sliced loaves onto the delivery channel again be permitted.

The stationary cams 169 are carried on blocks 170, which also serve as bearings for the cross shaft 154. These blocks are slidable on rods 171 extending from the brackets 132 (Figs. 9 and 10) so that they may be adjusted to accommodate loaves of different thicknesses. The blocks are held in adjusted position by set screws 172. In order to prevent any difference in the position of the two blocks on opposite sides of the machine, which would result in a skewed position of the cross shaft 154 and the plate 150, the rods 171 are formed with racks 173 with which engage gears 174 fixed on the cross shaft. Both blocks are thus constrained to move together.

It is preferred that the knives 180 be mounted in their frames in the following manner, as a more even tension can be given to the knives with a simpler supporting structure, and the tension of the knives themselves can if desired be made greater than with prior mountings. In this preferred manner of mounting the knives their lower ends are held in slotted lugs 181 (Fig. 1) extending from a bar 182 held in a dovetail groove in the knife frame by suitable screws. If it is desired to change the spacing of the knives the bar can be slid out of the groove and a new one having the desired spacing of lugs substituted. The knives are, as is customary, made with short cross pins 183 which rest against the lugs after the knives have been inserted in the slots therein.

Figure 24:
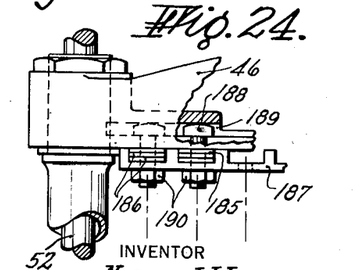
Fig. 24 (Sheet 2) is a detail of the construction of the mounting of the individual knives on the knife frame.

The upper ends of the knives have similar cross pins 184 which bear against the upper sides of slotted leaf springs 185. Additional leaves 186, of progressively shorter length, are mounted underneath the leaves 185 to give the spring strength desired. The several composite leaf springs are held in spaced relation by a slotted spacer bar 187 (Fig. 24, Sheet 2) held to the upper part of the frame by studs 188 extending into a T-slot 189 in the knife frame and secured by nuts 190. By changing spacer bars the studs can be slid along the T-slot so that they will serve to hold the blades in the spacing desired. To remove the knives from the frames the leaf springs are depressed by a suitably formed pinch bar or lever engaging under the top part of the knife frame, whereupon the blades can be slipped off from the upper slotted leaf spring and then removed from the lower lugs 181.

Figure 5:
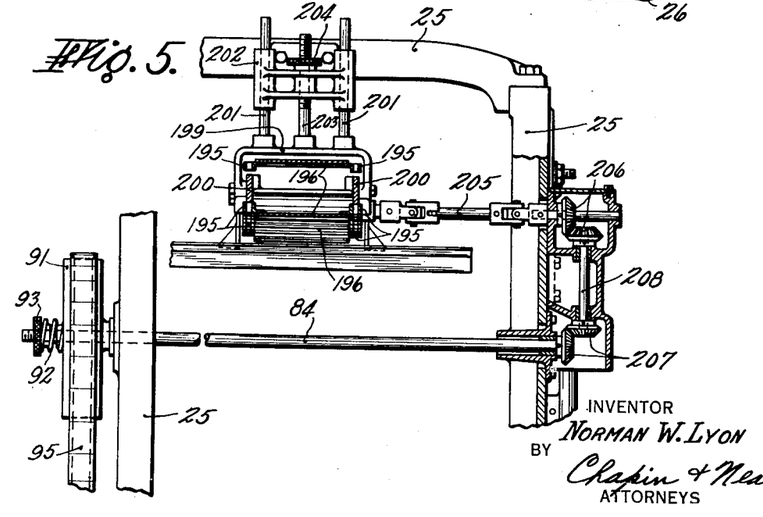
Fig. 5 is a section substantially on line 5—5 of Fig. 1, showing the driving means for the upper loaf forwarding conveyor.

For most forms of bread the mechanism so far described will be sufficient, but where bread of a particularly hard crust is to be sliced it may be necessary to exert more force on it than is possible to obtain by the frictional contact of the lugs 87 with the lower part of the loaf. Under these conditions it is desirable to employ an upper driven conveyor comprising chains 195 (Fig. 1) connected by lugs 196 of the same general character as lugs 87. These chains pass over idler sprockets 197 and over driving sprockets 198, both supported on a frame 199 which also carries rails 200 for insuring straight travel of the lower run of the chains. As is best shown in Fig. 5, the frame 199 is carried by rods 201 sliding in a bracket 202 secured to the frame 25 and is adjusted in vertical position to accommodate loaves of differing heights by a screw 203 on which is threaded a nut 204 in contact with the bracket. The shaft of the driving sprockets 198 is driven by a universal shaft 205, bevel gears 206 and 207, and an intermediate shaft 208, from the shaft 84 previously referred to.

The operation of the machine will be summarized briefly. The loaves to be sliced are placed in a continuous line on the feeding-in belt 75 by the operator. They are carried by this belt to the chains 85 which feed them to the reciprocating knives 180. As the sliced loaves issue from the knives they are positioned if necessary by the periodically movable plate 150 which releases each loaf in correct timing to be carried out of the machine by the lugs 142 of the delivery conveyor. If a loaf is not fed to the plate 150 in the correct timed relation its forward motion will be arrested until the next pusher lug comes along, provided always that there is sufficient pressure exerted on the leading loaf by the loaves back of it to swing the stop plate on its pivot. During the period of arrest of a complete line of loaves the friction drive through which the chains 85 derive their motion will slip, so that no damage to the loaves will result from the lugs 87 sliding under them. This will of course only occur if there is a complete series of loaves from the chains 85 to the stop plate 150, the absence of such a complete series leaving the chains free to advance successive loaves until they contact the one being held back by the stop plate. By this means it is insured that only one loaf will be present between each two of the delivery lugs 142. Absence of a loaf from between two successive lugs 142 will be taken care of by the automatic action of the wrapping machine, but the presence of two loaves in one space can cause considerable trouble and even damage due to the jamming of the wrapping machine which would result from the attempt to feed two loaves into it at one time.

I claim:

1. A bread slicing machine comprising slicing knives, endless conveyor means for feeding an abutting series of loaves to the knives, a delivery conveyor removing the sliced loaves in spaced relation from the knives, a stop plate, a cam operable to introduce the plate into the path of the loaves and to release said plate for motion out of said path in timed relation to the motion of the delivery conveyor, spring means for moving said plate out of the path of the loaves when such motion is permitted by the cam, abutting members engageable by the motion of the plate by the spring if no loaf pressure is exerted against the plate to prevent the motion of the plate out of the loaf path, said members being positioned to be moved out of abutting relation by loaf pressure against the plate prior to the release of the plate by the cam, and a friction drive for said endless conveyor means adapted to slip when a complete abutting series of loaves is restrained by said plate.

2. A bread slicing machine comprising slicing knives, means for feeding an abutting series of loaves to the knives, a delivery conveyor removing the slicing loaves in spaced relation from the knives, a stop plate interposed in the path of the loaves issuing from the knives, a cam operable to introduce the plate into the path of the loaves in timed relation to the motion of the delivery conveyor, and to release said plate for motion out of said path in timed relation to the motion of the delivery conveyor, spring means for moving said plate out of the path of the loaves when such motion is permitted by the cam, and means for restraining the motion of the plate out of the loaf path when no loaf pressure is exerted against it.

3. A bread slicing machine comprising slicing knives, means for feeding an abutting series of loaves to the knives, a delivery conveyor removing the sliced loaves in spaced relation from the knives, a stop plate, a cam operable to introduce the plate into the path of the loaves and to release said plate for motion out of said path in timed relation to the motion of the delivery conveyor, spring means for moving said plate out of the path of the loaves when such motion is permitted by the cam, and abutting members engageable by the motion of the plate by the spring if no loaf pressure is exerted against the plate to prevent the motion of the plate out of the loaf path, said members being positioned to be moved out of abutting relation by loaf pressure against the plate prior to the release of the plate by the cam.

4. A bread slicing machine comprising slicing knives, means for feeding an abutting series of loaves to the knives, a delivery conveyor removing the sliced loaves in spaced relation from the knives, a stop plate interposed in the path of the loaves issuing from the knives, means to remove the stop plate from the path of the loaves in timed relation to the motion of the delivery conveyor, and means operable in the absence of pressure of the loaf against the stop plate for rendering said plate removing means inactive.

5. A bread slicing machine comprising slicing knives, means for feeding an abutting series of loaves to the knives, a delivery conveyor removing the sliced loaves in spaced relation from the knives, a stop plate interposed in the path of the loaves issuing from the knives, means to remove the stop plate from the path of the loaves in timed relation to the motion of the delivery conveyor, means operable in the absence of pressure of a loaf against the stop plate for rendering said plate removing means inactive, and a drive for the loaf feeding means permitting it to stop when a complete abutting series of loaves is restrained by said stop plate.

6. A knife mounting for bread slicing machines comprising a substantially rigid knife frame, a series of slotted lugs at one side of the knife frame, a series of knives provided with cross pins in each end and received individually at one end in said slotted lugs, and a series of spaced multiple leaf springs at the opposite side of the knife frame, the leaf springs having one long leaf slotted to receive the second pinned end of the knives and a plurality of supporting leaves of shorter length than the long leaf to increase its stiffness.

7. A bread slicing machine comprising a frame substantially closed at its top, aligned pairs of guides pivotally mounted at their lower ends within the frame, a knife frame slidable on each aligned pair of guides, releasable means for holding the upper ends of the guides so that upon release the guides can be tilted into position for removing the knife frames without removing the top of the frame, and means releasably connected to the knife frame for reciprocating them.

8. A bread slicing machine comprising a frame substantially closed at its top, aligned pairs of guides pivotally and yieldably mounted at their lower ends within the frame, a knife frame slidable on each aligned pair of guides, releasable and yieldable means for holding the upper ends of the guides so that upon release the guides can be tilted into position for removing the knife frames without removing the top of the frame, the yielding mounting of the guides serving to prevent binding of the frames on the guides when the frames expand on account of the heat developed during the slicing operation, and means releasably connected to the knife frames for reciprocating them.

NORMAN W. LYON.